United States Patent [19]

Watanabe et al.

[11] Patent Number: 5,355,271

[45] Date of Patent: Oct. 11, 1994

[54] TAPE CASSETTE WITH RESILIENTLY MOUNTED TAPE CLEANER

[75] Inventors: Masaru Watanabe, Nishinomiya; Tousaku Nishiyama, Katano; Tsumoru Ohata, Kyoto; Kiyoshi Kobata, Takatsuki, all of Japan

[73] Assignee: Matsushita Electric Industrial Co., Ltd., Osaka, Japan

[21] Appl. No.: 13,378

[22] Filed: Feb. 4, 1993

[30] Foreign Application Priority Data

Feb. 7, 1992 [JP] Japan .................. 4-022392

[51] Int. Cl.⁵ .................................... G11B 5/41
[52] U.S. Cl. .......................... 360/137; 360/128
[58] Field of Search ............. 360/132, 137, 133, 128, 360/130.1; 242/197, 198, 199; 15/DIG. 11, DIG. 12, DIG. 13, 248.2, 250.2

[56] References Cited

U.S. PATENT DOCUMENTS

| | | | |
|---|---|---|---|
| 4,106,067 | 8/1978 | Masuyama et al. | 360/137 |
| 4,621,779 | 11/1986 | Fitterer et al. | 360/132 |
| 4,625,252 | 11/1986 | Balz et al. | 360/132 |
| 4,922,361 | 5/1990 | Bordignon | 360/130.31 |
| 4,933,797 | 6/1990 | Mizutani et al. | 360/132 |
| 4,942,492 | 7/1990 | Che | 360/132 |
| 4,947,270 | 8/1990 | Paynter, III | 360/137 |
| 5,189,585 | 2/1993 | Kubo | 360/133 |

FOREIGN PATENT DOCUMENTS

| | | |
|---|---|---|
| 0302974 | 2/1989 | European Pat. Off. . |
| 3602272 | 7/1986 | Fed. Rep. of Germany . |

*Primary Examiner*—Robert S. Tupper
*Assistant Examiner*—Allen Cao
*Attorney, Agent, or Firm*—Wenderoth, Lind & Ponack

[57] ABSTRACT

A sheet-shaped cleaner including a resilient film and nonwoven cloth consisting of synthetic fibers formed on one side of the film is disposed in opposition to a guide roller. A magnetic tape is sandwiched between the guide roller and the cleaner and with the magnetic surface of the magnetic tape being contacted by the nonwoven cloth of the cleaner. The film of the cleaner is wedged between locking portions of the cassette in order to cause the cleaner to bow in a direction away from the guide roller such that the nonwoven cloth of the cleaner is biased under a low force against the magnetic surface of the tape. Accordingly, foreign matter on the surface of the magnetic tape is removed.

5 Claims, 7 Drawing Sheets

TAPE CASSETTE WITH RESILIENTLY MOUNTED TAPE CLEANER

BACKGROUND OF THE INVENTION

1. Field of the Invention

The present invention relates to a tape cassette for accommodating a magnetic tape capable of recording information such as music and reproducing recorded information.

2. Description of the Related Art

A fixed magnetic head is used as a means for recording and reproducing digital signals of music or the like. It is very important for the digital recording/reproducing system to possess an error rate as low as possible in order to reproduce an original sound faithfully. As disclosed in Japanese Patent Laid-Open Publication No. 3-44857, a head-inserting window of a tape cassette and a pinch roller-inserting window thereof are closed to prevent foreign matter such as dust from penetrating into the tape cassette from the outside. The error rate of the above tape cassette is as large as $2 \times 10^{-2}$ when digital signals are recorded and reproduced. This is a fatal defect of the tape cassette in recording/reproducing digital signals. The error rate means the rate of the number of error signals to the number of data read out based on signals recorded on a magnetic tape. The inventors have discovered that a main reason the error rate is great is because in the process of manufacturing a tape or inserting the tape into the tape cassette, fine foreign matter sticks to the surface of the magnetic layer of the tape.

They have also discovered that the magnetic tape is shaven and powders generated by the shaving thereof stick to the surface of the magnetic layer of the tape when it is inserted into a tape cassette recorder to record signals or reproduce recorded signals. This is also one of the reasons why the error rate is great.

SUMMARY OF THE INVENTION

It is an object of the present invention to provide a tape cassette having a small error rate.

In accomplishing these and other objects of the present invention, there is provided a tape cassette comprising a cleaner, including a plate-shaped film and nonwoven cloth provided on the film, disposed in opposition to a guide roller or a tension pin. In this construction, the nonwoven cloth contacts a magnetic surface of a magnetic tape due to the elastic force of the film.

According to another embodiment, there is provided a tape cassette comprising a cleaner, including a plate-shaped film and nonwoven cloth provided on the film, disposed between a tape guide and a guide roller. In this construction, the nonwoven cloth contacts a magnetic surface of a magnetic tape due to the elastic force of the film.

According to the above-described embodiments, the non woven cloth of the cleaner removes fine foreign matter from the magnetic surface of the magnetic tape to which the fine foreign matter has stuck, thus ensuring that the error rate of the tape cassette is small.

The nonwoven cloth of the present invention is of synthetic fibers such as rayon, nylon, polyester, acrylic, polypropylene, fluorine fibers and the like or a mixture thereof twined together in random directions by a mechanical means. The nonwoven cloth functions as an effective cleaner of the tape in that it entrains foreign matter after it has removed the foreign matter from the magnetic surface of the tape. The reason why the nonwoven cloth consists of synthetic fibers is because the frictional resistance of the nonwoven cloth to the magnetic surface of the tap must be small. That is, the coefficient of dynamic friction of the nonwoven cloth with respect to the magnetic surface of the tape is to be smaller than 0.35. The nonwoven cloth allows the tape to travel smoothly to such a degree that the tension applied to the traveling tape is almost the same as that applied when the cleaner is not used in the tape cassette. This is very important for the following reason. In using the tape cassette on a portable deck, a small power consumption suffices for causing the tape to travel. Thus, it is possible for the tape cassette of the present invention to reproduce recorded signals in almost the same period as that required for the conventional tape cassette to do so. Since the cleaner consisting of the film and the nonwoven cloth is sheet-shaped, the cleaner has a proper elasticity. Therefore, the tape which travels in contact with the cleaner is not subjected to a great force and hence the tape is uniformly pressed in the widthwise direction thereof by the cleaner. Thus, the stable travel of the tape can be ensured. On the other hand, a metal leaf spring cannot ensure the stable travel of the tape. The cleaner cannot be uniformly pressed against the tape in the widthwise direction thereof because the metal leaf spring is more rigid than the film according to the present invention. As a result, the position of the tape would deviate in the widthwise direction of the tape during its travel.

BRIEF DESCRIPTION OF THE DRAWINGS

These and other objects and features of the present invention will become clear from the following description taken in conjunction with the preferred embodiments thereof with reference to the accompanying drawings, in which:

FIG. 5b is a side elevation view of the cleaner shown in FIG. 5a;

DETAILED DESCRIPTION OF THE INVENTION

Figure 1:
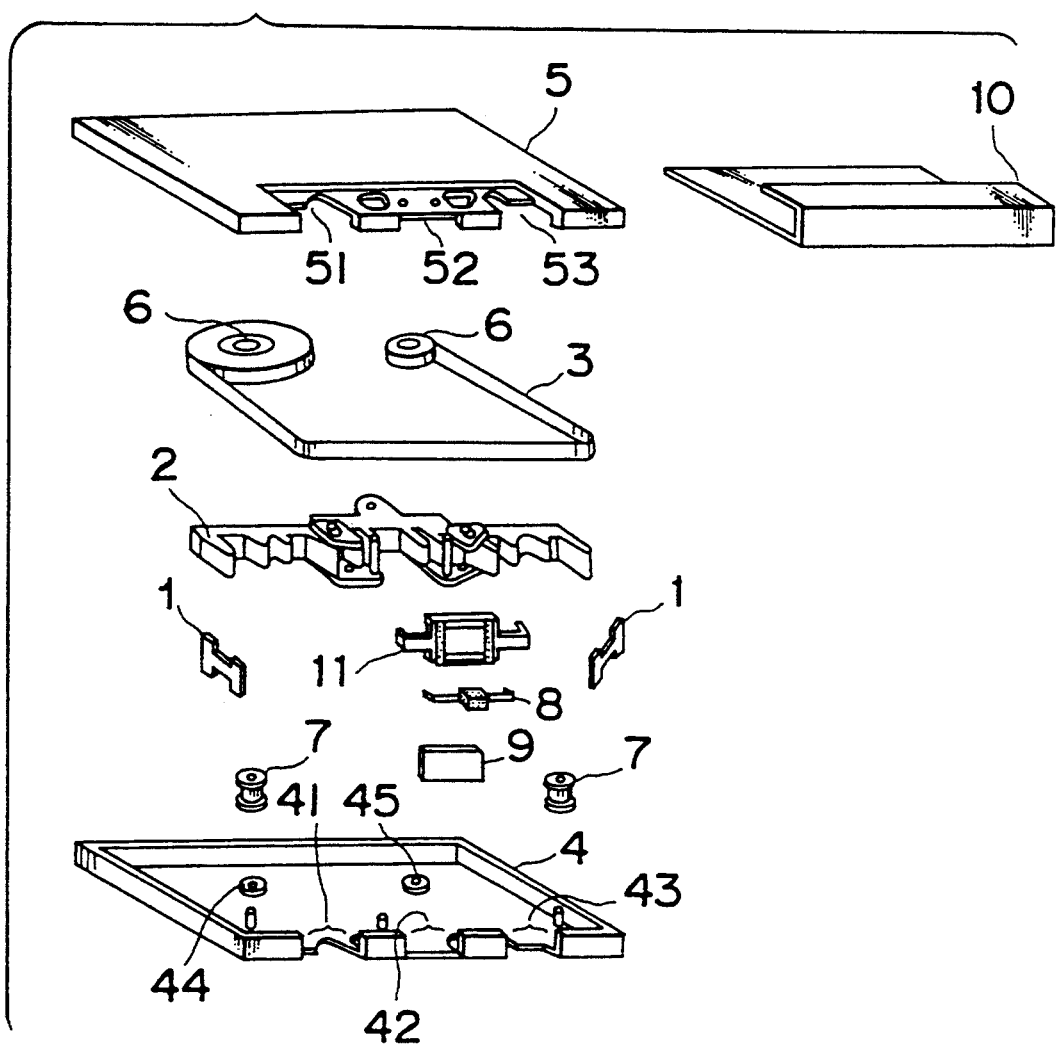
FIG. 1 is an exploded perspective view of a tape cassette according to the present invention.

Before the description of the present invention proceeds, it is to be noted that like parts are designated by like reference numerals throughout the accompanying drawings.

Figure 2A:
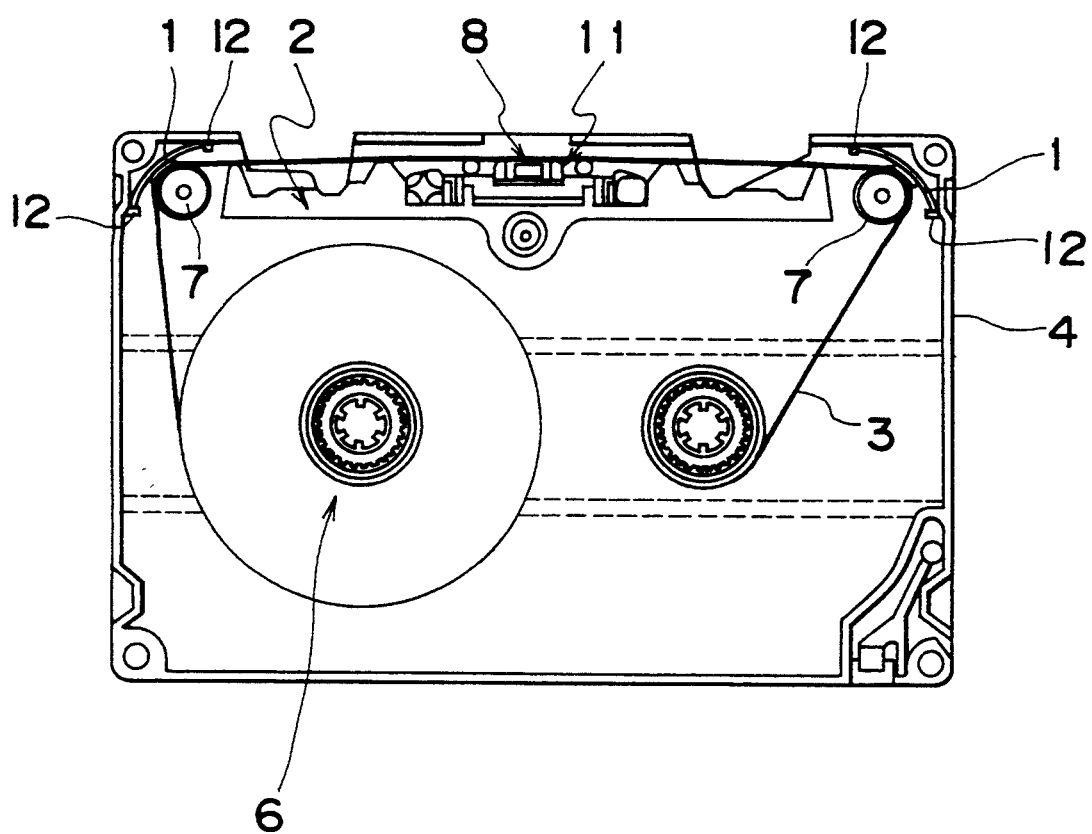
FIG. 2a is a sectional view of a first embodiment of a tape cassette according to the present invention.

A tape cassette according to the present invention will be described below with reference to the accompanying drawings. Referring to FIGS. 1 through 3, a first embodiment will be described below. Head-inserting windows 42 and pinch-inserting windows 41 and 43 are formed on a lower casing 4. Similarly, head-inserting windows 52 and pinch-inserting windows 51 and 53 are formed on an upper casing 5. A tape guide 2 is made of a polyacetal mixed with carbon so that abraded powders are not generated when a magnetic tape 3 slides thereover.

In the first embodiment, the tape guide 2 is separate from the upper casing 5 and the lower casing 4 as shown in FIG. 1, but the tape guide 2 may be integral with the upper casing 5 or the lower casing 4.

A shutter 10 has a U-shaped section and is slidable, to open and close the windows 41, 51, 42, 52, 43, and 53, in a direction extending through both centers of a pair of reel base-inserting openings 44 and 45. In this manner, dust can be prevented from penetrating into the tape cassette from the outside of the tape cassette. The tape cassette comprises a guide device 11 which allows the tape 3 to contact the head reliably. Similar to a conventional analog compact tape cassette, the tape cassette has a shield 9, a pad 8, a hub 6, and a guide roller 7. The tape cassette further comprises a pair of sheet-shaped cleaners 1, consisting of nonwoven cloth 102 and a film 101, disposed in opposition to the guide roller 7.

Figure 2B:
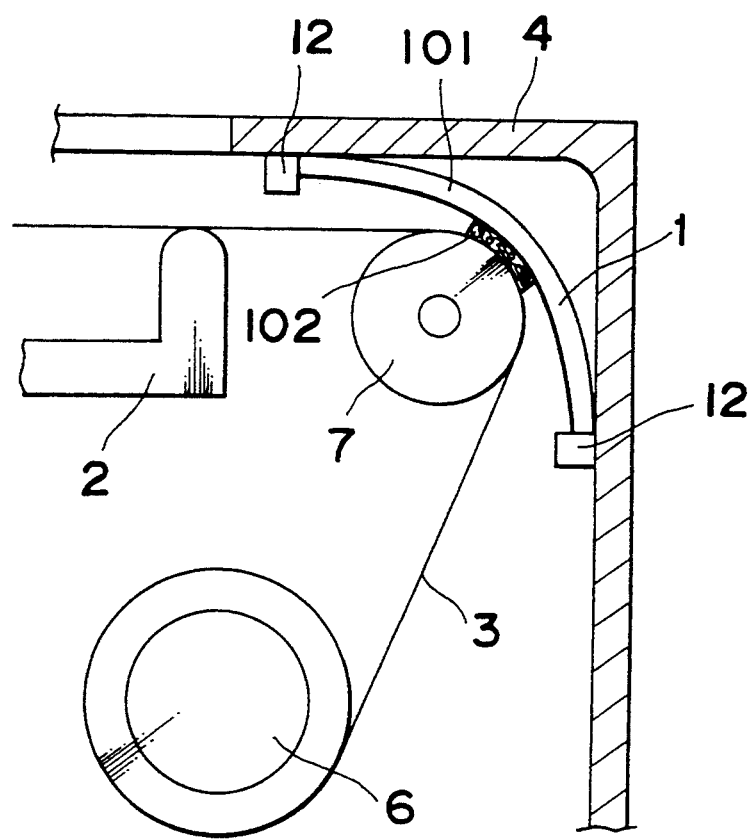
FIG. 2b is a sectional view of a portion of the first embodiment of the present invention in which a cleaner of the tape cassette is disposed.

The cleaner 1 is mounted on the right side of tape cassette in the same way as the cleaner 1 on the left side, only one side of the cassette being shown in FIG. 2b.

The cleaner 1 contacts the magnetic surface of the tape 3. Since the non-woven cloth 102 is brought into contact with the tape 3 on the guide roller 7 by the elastic force of the film 101, the nonwoven cloth 102 is capable of effectively cleaning the magnetic surface of the tape 3.

Both ends of the cleaner 1 are engaged with the cassette case at two locking portions 12 formed on the lower casing 4 so as to prevent movement of the cleaner 1. Although not shown in FIG. 2, locking portions similar to the locking portions 12 of the lower casing 4 are formed on the upper casing 5 as well. The cleaner 1 is not limited to being supported on the lower casing 4 as shown in FIG. 2. That is, the cleaner 1 may be fixed to the upper casing 5. In the first embodiment of the tape cassette, it is essential to lock both ends of the cleaner 1 to the tape cassette as shown in FIG. 2. That is, the cleaner 1 would apply a small pressing force to the tape 3 if the cleaner 1 were supported only at one end thereof. As a result, fine foreign matter which has stuck to the surface of the tape 3 would not be removed therefrom. Since the cleaner 1 of the invention is supported by the tape cassette at both ends thereof, the cleaner 1 applies a great force to the tape 3, thus removing the foreign matter efficiently from the surface of the tape 3.

Figure 3A:
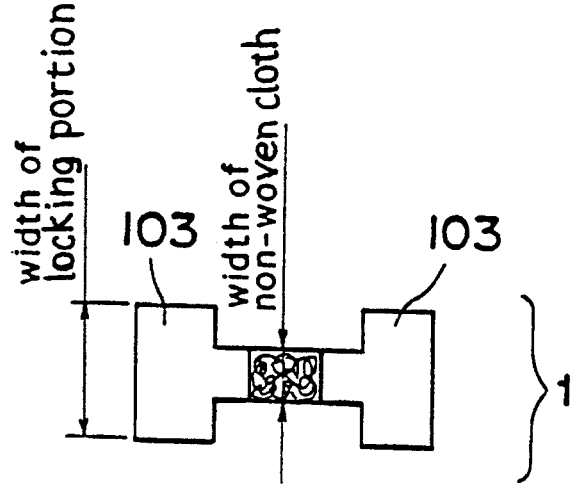
FIG. 3a is a plan view of a cleaner of the present invention.
Figure 3B:
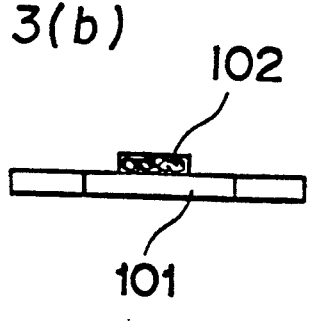
FIG. 3b is a side elevation view of the cleaner.

As shown in FIGS. 3a and 3b, the cleaner 1 is made of the film 101 and the nonwoven cloth 102 consisting of synthetic fibers. As shown in FIG. 3a, the film 101 comprises a pair of locking portions 103, disposed at both ends thereof, for locking the cleaner 1 to the tape cassette. The width of each locking portion 103 is such that the cleaner 1 is prevented from moving in the tape cassette in the direction of thickness of the cassette. The width of the nonwoven cloth 102 is a little greater than the width of the tape 3 so that the surface of the tape 3 can be cleaned even though the position of the tape 3 deviates its widthwise direction during its travel past the cleaner 1.

As shown in FIG. 3b, the cleaner 1 has a two-layer construction comprising the film 101 and a layer of the nonwoven cloth 102 disposed on the film 101. The film 101 is made of polyester such as polyethylene terephthalate. Preferably, the film 1 may be a plastic film consisting of polyamide, polyamide or aramide so that the film 101 is resistant to high temperatures. The nonwoven cloth 102 of the first embodiment is made of synthetic fibers of rayon, nylon, polyester or polypropylene or a mixture thereof. Other synthetic fibers may be used as long as they effectively remove foreign matter from the surface of the tape 3 and provide a coefficient of dynamic friction with the tape 3 that is less than 0.35. The inventors have found that the following nonwoven cloth made of synthetic fibers needs such requirements: Brand numbers 149-303, 149-246, 149-188, and 149-007 all manufactured by Velatech Corp. of Japan and Brand number VA-250 manufactured by Mitsubishi Rayon Co., Ltd. of Japan.

Figure 7:
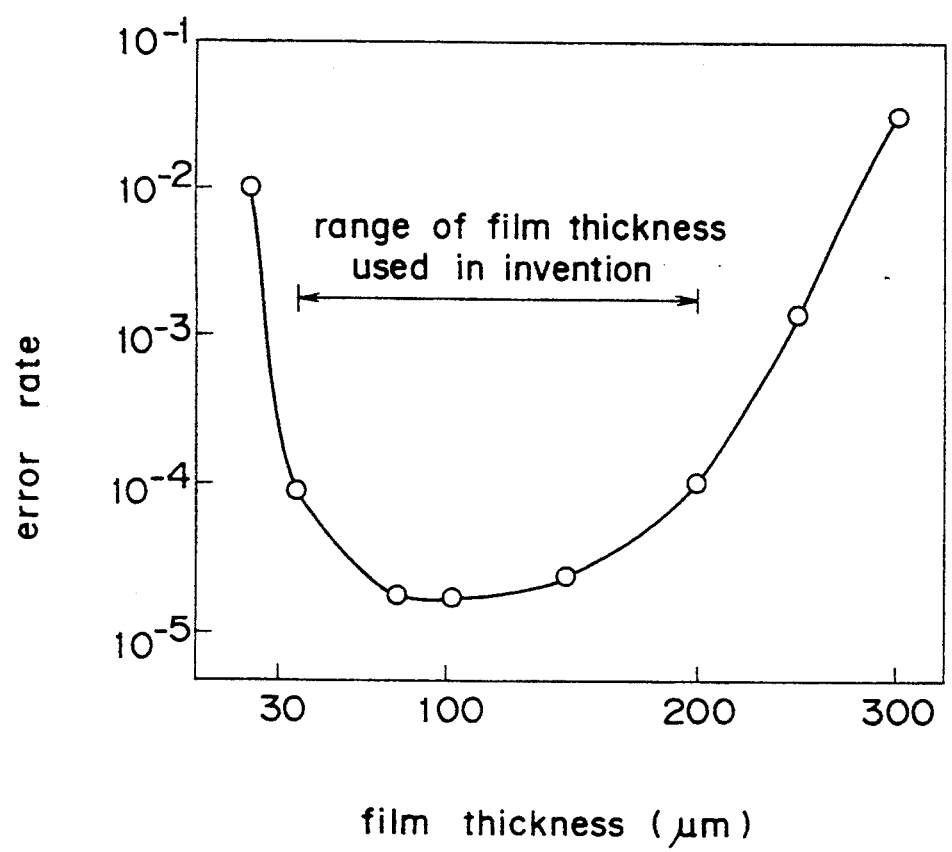
FIG. 7 is a graph showing the relationship between the thickness of a film and error rate.

The thickness of the nonwoven cloth 102 ranges from 100 $\mu$m to 300 $\mu$m and the density thereof ranges from 30 g/m$^2$ to 60 g/m$^2$. The thickness of the film 101 ranges from 30 $\mu$m to 200 $\mu$m so that the cleaner 1 exerts an appropriate force on the tape 3. FIG. 7 shows the relationship between the various thicknesses of the film 101 and error rate. If the thickness of the film 101 is smaller than 30 $\mu$m, the cleaner 1 presses the tape 3 with a very small force. As a result, the cleaner 1 has no effect of removing foreign matter from the surface of the tape 3 and consequently, the error rate of the tape cassette is as great as approximately $10^{-2}$. This is a fatal defect of the tape cassette in recording/reproducing signals. If the thickness of the film 101 is greater than 200 $\mu$m, the film 101 is as hard as a solid body, i.e., the cleaner 1 is not appropriately elastic and consequently, the nonwoven cloth 102 cannot be uniformly brought into contact with the tape 3. Consequently, the error rate of the tape cassette is greater than $10^{-3}$. This is also a fatal defect of the tape cassette. Therefore, according to the present invention, the film thickness ranges from 30 $\mu$m to 200 $\mu$m so as to limit the error rate of the tape cassette to a low level smaller than $10^{-4}$.

The film 101 and the nonwoven cloth 102 are adhered to each other with an adhesive agent or thermally bonded to each other to form the sheet-shaped cleaner 1.

According to the above-described construction, the nonwoven cloth 102 of the cleaner 1 is always in contact with the magnetic surface of the tape 3. Therefore, fine foreign matter which has stuck to the tape surface is removed therefrom by the nonwoven cloth 102 and held in the nonwoven cloth 102. Thus, the tape cassette has a small error rate. Further, since the film 101 of the cleaner 1 provides the cleaner 1 with an appropriate elasticity, the tape 3 is not subjected to a great force even though the tape 3 travels between the cleaner 1 and the guide roll 7 in contact therewith. As a result, the reliable travel of the tape 3 can be ensured.

Signals of 48 KHz were recorded on the tape in the cassette to measure the error rate of the tape cassette. The result was that the error rate of the tape cassette was as small as $2 \times 10^{-5}$ which was much smaller than the error rate of the conventional tape cassette which was as great as $2 \times 10^{-3}$.

Figure 4:
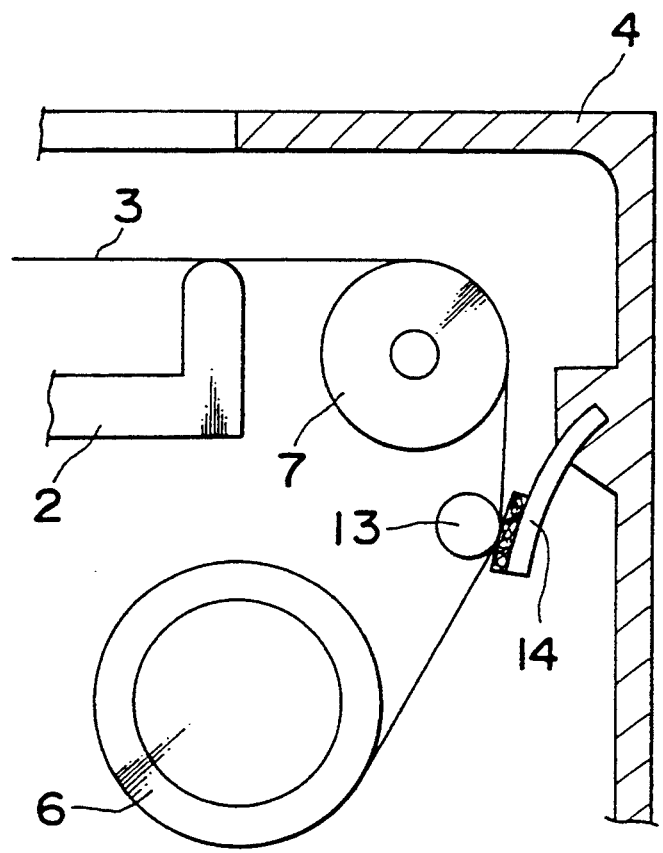
FIG. 4 is a sectional view of a portion of a second embodiment of the present invention in which a cleaner of the tape cassette is disposed.
Figure 5A:
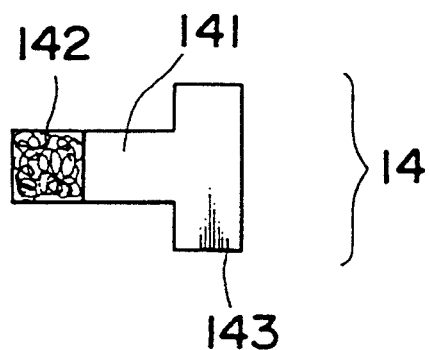
FIG. 5a is a plan view of the cleaner of the second embodiment of the present invention.
Figure 5B:
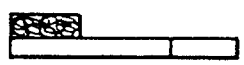

A tape cassette according to a second embodiment will be described below with reference to FIGS. 4 and 5. The second embodiment is different from the first embodiment in that a sheet-shaped cleaner 14 comprising a film and nonwoven cloth consisting of synthetic fibers formed on one side of the film is disposed in opposition to a tension pin 13 interposed between the guide roller 7 and a hub 6 in such a manner that the nonwoven cloth of the cleaner 14 contacts a magnetic tape 3 sandwiched between the cleaner 14 and the tension pin 13. The material and thickness of the film 141 and those of the nonwoven cloth 142 of the cleaner 14 are similar to those of the first embodiment. Therefore, the description thereof is omitted herein. Referring to FIG. 4, the cleaner 14 has only one locking portion 143, namely, a cantilever support. But similar to the first embodiment, both ends of the cleaner 14 may be locked to the tape cassette. According to the cleaner 14 of the second embodiment, in addition to the advantage of removing foreign matter from the surface of the tape 3, the cleaner can prevent the position of the tape from deviating its widthwise direction during its travel tape. This is because the tape 3 is wound around the hub 6 with the tape 3 sandwiched between the tension pin 13 and the cleaner 14. In this manner, the tape 3 can be reliably wound around the hub 6. Thus, the reliable travel of the tape 3 can be ensured. That is, the tape cassette has a fine quality, i.e., the output level in reproducing recorded signals fluctuates to a smaller extent than in the conventional tape cassette.

Figure 6:
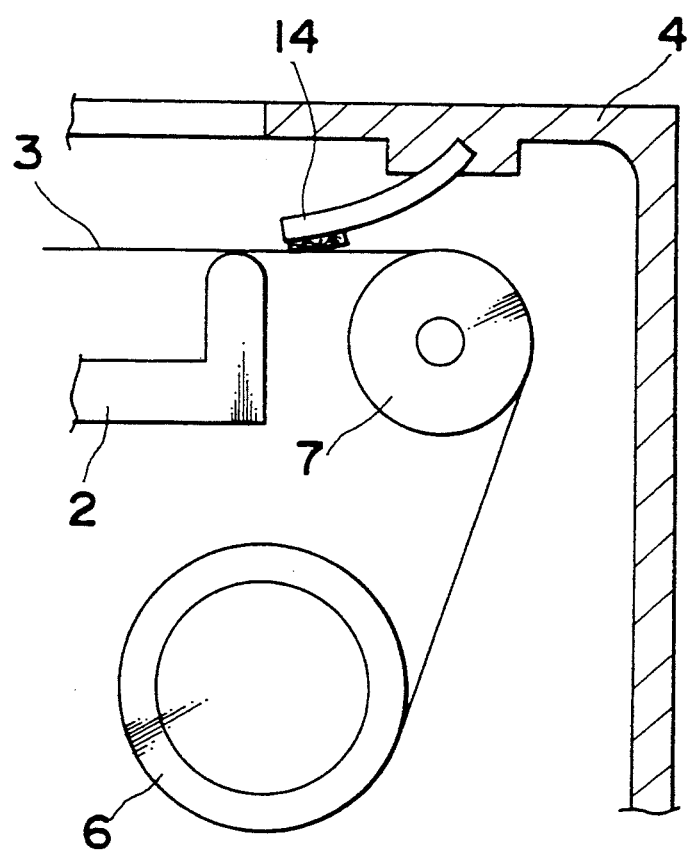
FIG. 6 is a sectional view of a portion of a third embodiment of a tape cassette according to the present invention in which a cleaner of the tape cassette is disposed.

A tape cassette according to a third embodiment will be described below with reference to FIG. 6. The third embodiment is different from the first and second embodiments in that the cleaner 14 comprising a film and nonwoven cloth consisting of synthetic fibers formed on one side of the film is disposed between the tape guide 2 and the guide roller 7 and that the magnetic surface of the tape 3 contacts the nonwoven cloth of the cleaner 14 without the surface of the tape 3 opposite to the magnetic surface thereof being supported. Since the configuration and material of the cleaner 14 according to the third embodiment are similar to those of the cleaner according to the first and second embodiments, the description thereof is omitted herein. Since the nonwoven cloth 142 of the cleaner 14 always contacts the magnetic surface of the tape 3, fine foreign matter which has stuck to the tape surface is removed therefrom by the nonwoven cloth 142 and further, the foreign matter is held in the nonwoven cloth 142. Accordingly, the error rate of the tape cassette is small. As another advantage of the third embodiment, since the magnetic surface of the tape 3 contacts the nonwoven cloth 142 of the cleaner 14 without the surface of the tape 3 opposite to the magnetic surface thereof being supported, tension is applied to the tape 3 to a small degree while the tape 3 is traveling to record information or reproduce recorded information. That is, according to the first and second embodiments, since the tape is sandwiched between the cleaner and the guide roll and between the cleaner and the tension pin, respectively, while the tape is traveling, tension is applied to the tape to a high extent due to the frictional resistance between the tape and the cleaner. The value of the tension applied to the tape 3 according to the tape cassette of the third embodiment is almost equal to the value of the tension applied to the tape according to the conventional tape cassette not provided with the cleaner. Since power consumption is small in a portable deck, when tension is applied to the tape 3 to a small extent, the tape cassette can reproduce recorded information for a longer period of time as compared with the case in which tension is applied thereto to a large extent.

Signals of 48 KHz were recorded on the tape in the cassette to measure the error rate of the tape cassette. The result was that the error rate of the tape cassette was as small as $4 \times 10^{-5}$ which was much smaller than the error rate of the conventional tape cassette which was as great as $2 \times 10^{-2}$.

Although the present invention has been fully described in connection with the preferred embodiments thereof with reference to the accompanying drawings, it is to be noted that various changes and modifications will become apparent to those skilled in the art. Such changes and modifications are to be understood as included within the scope of the present invention as defined by the appended claims unless they otherwise therefrom.

What is claimed is:

1. A tape cassette comprising: a casing including two locking portions, a magnetic tape having a magnetic surface and wound within said casing, a guide roller disposed within said casing and over which said tape extends so as to be guided by the guide roller, the magnetic surface of said tape facing away from said guide roller, and a cleaner disposed in said casing opposite said guide roller, said cleaner including a piece of resilient film having opposite ends and a central portion located between said opposite ends, and nonwoven cloth disposed on the central portion of said film, the film of said cleaner being wedged between the locking portions of said casing with said opposite ends thereof engaged by the locking portions such that said resilient film is bowed away from said guide roller, and the nonwoven cloth of said cleaner being biased against the magnetic surface of said tape opposite said guide roller due to the resiliency of the film of the cleaner.

2. A tape cassette as claimed in claim 1, wherein said cleaner consists of said resilient film and said nonwoven cloth, said nonwoven cloth consists of synthetic fibers, and the nonwoven cloth is bonded to said film.

3. A tape cassette as claimed in claim 1, wherein said film is of a material selected from the group consisting of polyethylene, terephthalate, polyimide, polyamide and aramide.

4. A tape cassette as claimed in claim 1, wherein said film is a plastic film having a thickness of 30 $\mu$m to 200 $\mu$m.

5. A tape cassette as claimed in claim 1, wherein said central portion of the film is narrower than each of the opposite ends of said film.

* * * * *